US006793063B1

(12) United States Patent
Gillet et al.

(10) Patent No.: US 6,793,063 B1
(45) Date of Patent: Sep. 21, 2004

(54) PROCESS AND MACHINE FOR MERGING ORDERED BATCHES OF OBJECTS, IN PARTICULAR BATCHES OF MAIL ITEMS

(75) Inventors: Francois Gillet, Lyons (FR); Guy Forella, Saint Peray (FR)

(73) Assignee: Solystic, Gentilly Cedex (FR)

( * ) Notice: Subject to any disclaimer, the term of this patent is extended or adjusted under 35 U.S.C. 154(b) by 179 days.

(21) Appl. No.: 10/031,430

(22) PCT Filed: Oct. 25, 2000

(86) PCT No.: PCT/EP00/10502

§ 371 (c)(1),
(2), (4) Date: May 10, 2002

(87) PCT Pub. No.: WO01/30514

PCT Pub. Date: May 3, 2001

(30) Foreign Application Priority Data

Oct. 26, 1999 (FR) ........................................... 99 13362

(51) Int. Cl.[7] ............................................... B65G 37/00

(52) U.S. Cl. .................... 198/349; 198/349.5; 198/448; 198/358

(58) Field of Search ................................. 198/443, 444, 198/448, 349, 358, 349.5, 349.6, 349.8; 414/797.4, 797.6, 798.9

(56) References Cited

U.S. PATENT DOCUMENTS 3,125,230 A * 3/1964 Edmunds et al. ........ 198/349.5
4,244,672 A * 1/1981 Lund .......................... 198/350
4,629,172 A * 12/1986 Kameyama et al. ........ 198/448
5,125,783 A * 6/1992 Kawasoe et al. ........... 414/279
5,349,968 A * 9/1994 Rizzoli et al. .............. 198/448
5,755,316 A * 5/1998 Reist ........................ 198/349.6
5,860,504 A * 1/1999 Lazzarotti ................... 198/357

FOREIGN PATENT DOCUMENTS

EP 834354 A1 * 9/1997 ................. 198/358

* cited by examiner

*Primary Examiner*—James R. Bidwell
(74) *Attorney, Agent, or Firm*—Pitney Hardin LLP

(57) ABSTRACT

The machine for merging batches of objects, in particular batches (L1, L2) of mail items (A) previously ordered according to their order of distribution in the mailman's round, so as to constitute a single batch of mail items which is ordered according to the mailman's round comprises: a) destacking units (D1, D2), b) linked to the exit of each destacking unit, one or more dynamic-storage magazines (M11–M22) in each of which the items are moved in series around a storage loop, and interposed between each destacking unit and a dynamic-storage magazine, a device (DL1, DL2) for reading a classifying cue on each destacked object; c) a conveyor (CS) in which the mail items are moved in series and to which the dynamic-storage magazines are linked in parallel, d) a control/command unit (U) for the destacking units and for the dynamic-storage magazines which, on the basis of the classifying cues read by the reading devices, controls the transferring of the mail items from the destacking units to the dynamic-storage magazines and then from the dynamic-storage magazines to the conveyor.

8 Claims, 2 Drawing Sheets

PROCESS AND MACHINE FOR MERGING ORDERED BATCHES OF OBJECTS, IN PARTICULAR BATCHES OF MAIL ITEMS

BACKGROUND OF THE INVENTION

The invention pertains to a process for merging in particular batches of mail items such as letters, each previously ordered according to the order of distribution of the mail items in the mailman's round, so as to constitute a single batch of mail items which is also ordered according to the order of distribution of the mail items in the mailman's round.

In mail distribution offices, it is usual practice to merge or bundle together batches of mail items which originate from various sorting offices so as to constitute a single batch of mail items which is prepared for the mailman's round. Hitherto, the merging of these batches of mail items has been carried out manually and therefore requires a great deal of time. EP-834354 discloses a process according to the preamble of claim 1 wherein the destacking-units, disposed in succession along the conveyor path, deliver the objects directly to the conveyor in a time sequence determined by their transport along the conveyor path. U.S. Pat. No. 4,244,672 discloses a process for merging batches of objects wherein the destacking units deliver the objects to the conveyor through a recalculation buffer.

SUMMARY OF THE INVENTION

The purpose of the invention is to propose a process for automatically merging several batches of mail items with short transit time loops associated to the destacking units.

To this end, the subject of the invention is a process for merging in particular batches of mail items as defined in claim 1.

With the process according to the invention, several batches of mail items can be automatically merged in a single pass. The postal address recovered by the reading device can be a bar code which is now widely used in postal sorting offices.

It has been observed that it is preferable to use several storage loops of low storage capacity associated with a destacking unit rather than a single storage loop of larger storage capacity so as to transfer the mail items more speedily to the conveyor. The number of storage loops associated with a destacking unit and the storage capacity of each loop is a compromise between the speed of merging of the batches of mail items and the interclassification window required between batches of mail items.

An exemplary implementation of the process according to the invention is described hereinafter in detail and illustrated in the drawings.

DETAILED DESCRIPTION OF THE PREFERRED EMBODIMENTS

Figure 1:
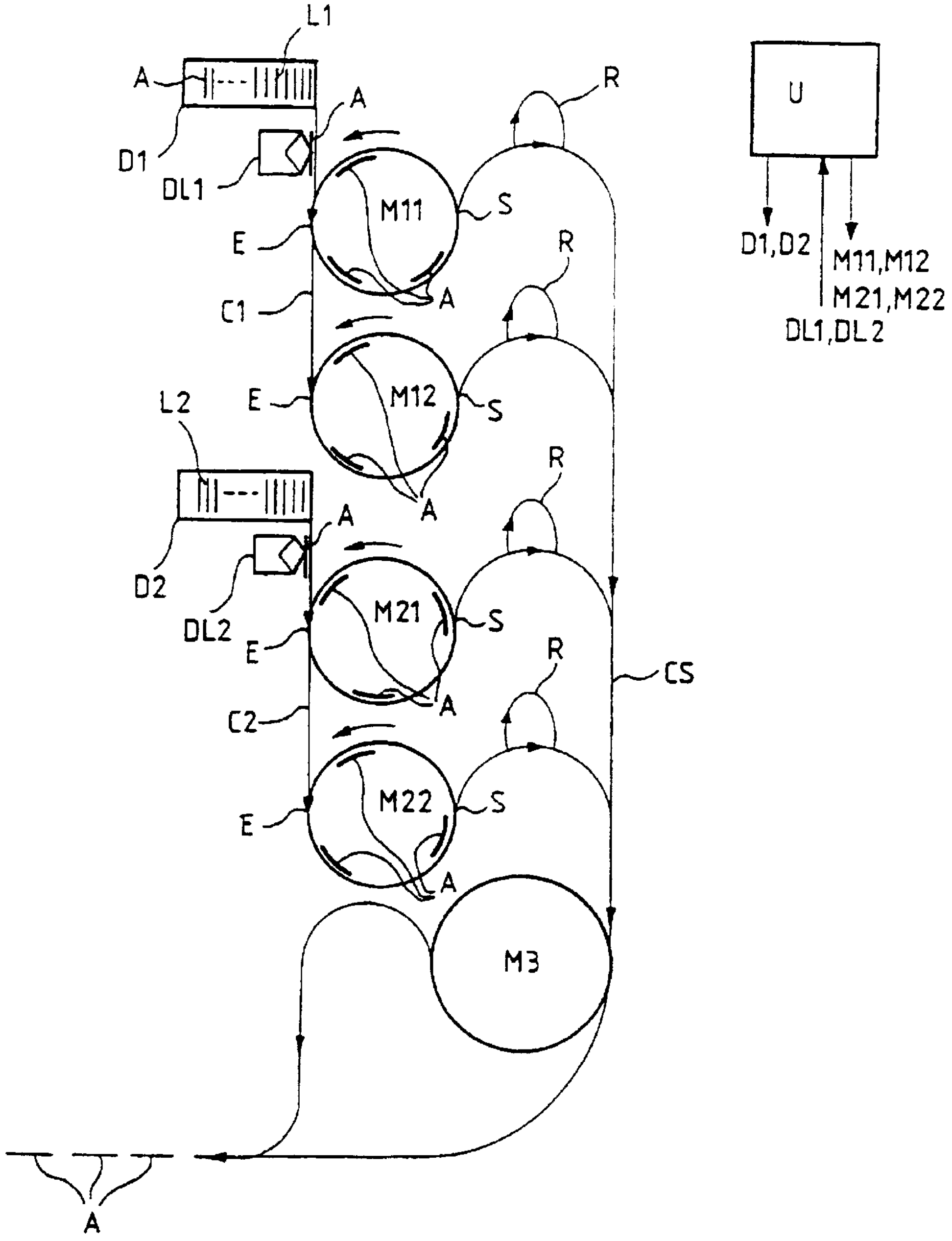
FIG. 1 shows very diagrammatically a machine for merging batches of mail items according to the process of the invention.

In FIG. 1, the machine for merging batches of mail items according to the process of the invention comprises several destacking units, here two destacking units D1 and D2, each able to serialize mail items of a batch of mail items which is preordered for the mailman's round, here the batches L1 and L2 which are loaded respectively into the destacking units D1 and D2.

The exit of each destacking unit is linked to one or more dynamic-storage magazines which is or which are associated with the relevant destacking unit. In each dynamic-storage magazine, the mail items indicated by A are moved continuously in series around a storage loop.

In the example of FIG. 1, the exit of the destacking unit D1 is linked to two storage loops M11 and M12 by way of a series conveyor C1, the entrances E of the two storage loops M11 and M12 being linked in parallel to the conveyor C1.

The destacking unit D2 is linked to two other storage loops M21 and M22 by way of another series conveyor C2. The entrances E of the two storage loops M21 and M22 are linked in parallel to the conveyor C2.

Each storage loop M11 to M22 comprises an entrance E and an exit S disposed at two points of the loop and is able to store a certain number of mail items, in the present case three mail Items. Each storage magazine M11 to M22 comprises a routing flap (not represented) disposed at the entrance point E of the storage loop and a routing flap (not represented) disposed at the exit point S of the storage loop allowing the introduction or the extraction of a mail item in the storage loop.

A first reading device DL1 is disposed along the conveyor C1 between the exit of the destacking unit D1 and the entrance E of the storage loop M11 furthest upstream on the conveyor C1 so as to read the postal address of each mail item extracted from the destacking unit D1 which we be transferred to the storage loops M11 or M12.

A second reading device DL2 is disposed along the conveyor C2 between the exit of the destacking unit D2 and the entrance E of the storage loop M21 furthest upstream on the conveyor C2 so as to read the postal address of each mail item extracted from the destacking unit D2 which will be transferred to the storage loops M21 or M22.

The reading devices DL1 and DL2 can be devices for reading matrix codes, for example bar codes.

The exits S of the storage loops M11 to M22 are linked in parallel to an exit conveyor CS in which the mail items are conveyed in series.

The conveyors C1, C2 and CS can be belt-type conveyors known per se. The dynamic-storage magazines M11 to M22 can also be embodied in the form of belt-type conveyors.

A control/command unit U synchronizes the transferring of the mail items from the destacking units D1 and D2 to the dynamic-storage magazines M11 to M22, receivers the postal addresses read (or the bar codes) by the reading devices DL1 and DL2 and synchronizes the transfer of the mail items from the dynamic-storage magazines M11 to M22 to the exit conveyor CS so that the mail items A exit the conveyor CS according to their order of distribution in the mailman's round.

Each link between the exit S of a storage loop and the exit conveyor CS can include a delay line R mounted in parallel with the link and which serves to compensate for the differences in path length of the mail items between the exits S of the storage loops M11 to M22 and the exit of the conveyor CS so as to maintain a constant spacing between the mail items moved in series in the conveyor CS.

Moreover, another dynamic-storage magazine M3 having a storage loop which is mounted in parallel with the conveyor CS downstream of the point of confluence with the dynamic-storage magazine M22 in such a way as to make it possible to recover certain defects of classification of the mail items in the batches L1 and L2 to be merged. It is of course understood that the delay lines R and the dynamic-storage magazine M3 are under the control of the control/command unit U.

The exit of the conveyor CS can feed the entrance to a device for stacking mail items so as to produce a stack of mail items which is ready for the mailman's round.

Figure 2:
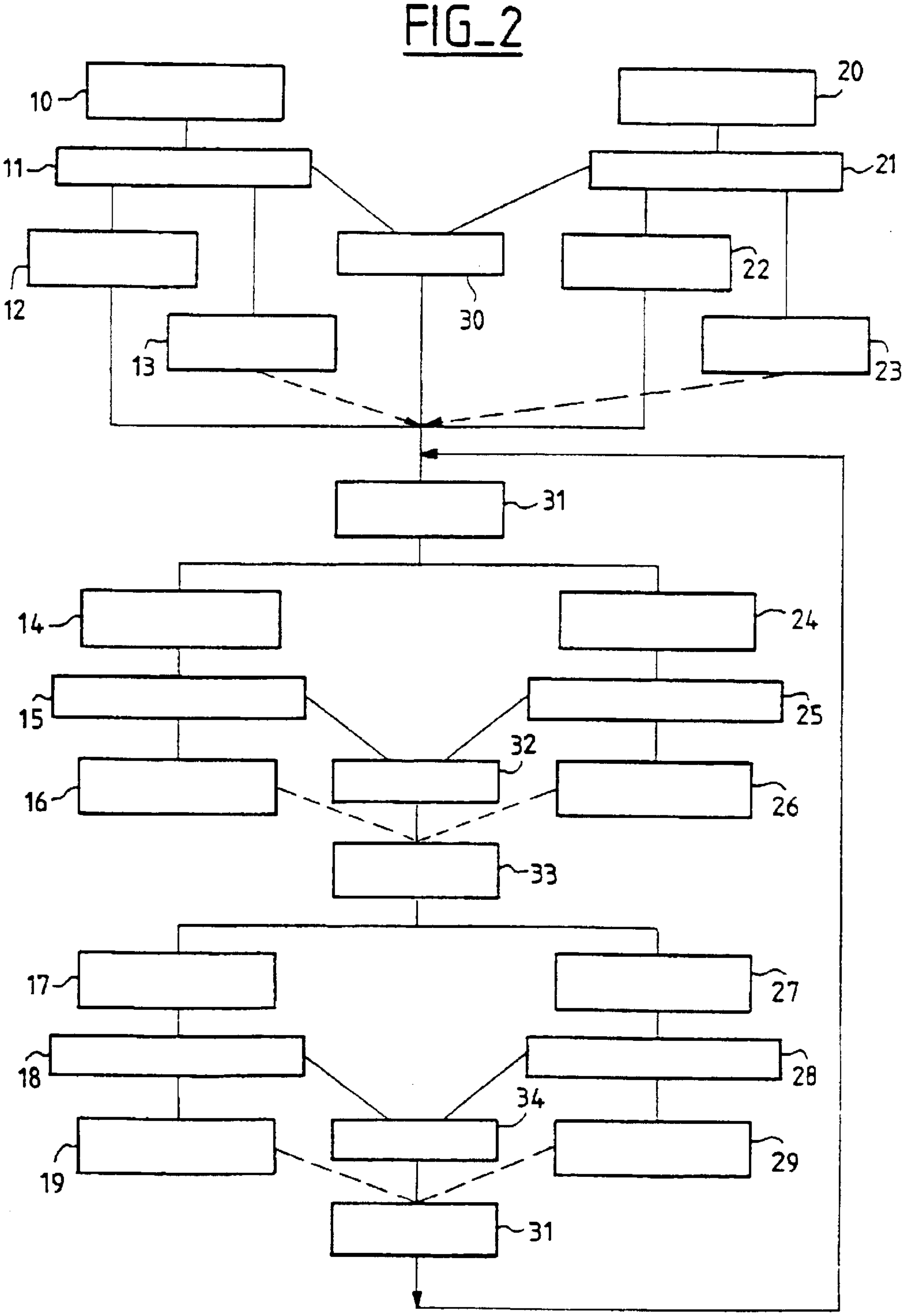
FIG. 2 is a flowchart illustrating the manner of operation of the machine shown in FIG. 1.

FIG. 2 illustrates the manner of operation of the machine shown in FIG. 1.

The batch L1 of mail items is therefore loaded into the destacking unit D1 and the batch L2 of mail items is loaded into the destacking unit D2. These two batches have previously been ordered according to the order of distribution of the mail items in the mailman's round.

If N1/2 corresponds to the storage capacity in terms of number of mail items of a storage loop such as M11 (in the case of the example in FIG. 1, N1/2 is equal to 3), the control/command unit U acts on the units D1 and D2 so as to serialize on exit from D1, N1 mail items, this being symbolized by the block 10, and on exit from D2, N1 mail items, this being symbolized by the block 20.

The postal addresses (or corresponding bar codes) of the N1 mail items serialized on exit D1 and traveling past the reading device DL1 are recovered by the control/command unit U, this being symbolized by the block 11.

The postal addresses (or corresponding bar codes) of the N1 mail items serialized on exit from D2 and traveling past the reading device D2 are also recovered by the control/command unit U, this being symbolized by the block 21.

In tandem with their destacking from D1, N1/2 first mail items A are initially transferred into the storage loop M11, this being represented by the block 12 and the following N1/2 mail items A destacked from D1 are transferred into the storage loop M12, this being symbolized by the block 13.

At the same time, in tandem with their destacking from D2, N1/2 first mail items A are initially transferred into the storage loop M21, this being represented by the block 22 and the following N1/2 mail items A destacked from D2 are transferred into the storage loop M22, this being symbolized by the block 23.

The control/command unit U keeps in memory a logical representation of the mailman's round in respect of the mail items A loaded into D1 and D2, analyzes the postal addresses recovered by the reading devices DL1 and DL2 so as to reorder them according to the mailman's round held in logic form in memory, this being symbolized by the block 30, and command accordingly, on the basis of these exit postal addresses in conjunction with the location of the mall items in the storage loops, the extraction according to the appropriate sequence of the mail items from the loops M11 to M22 and their transfer to the conveyor CS so that these mail items exit the conveyor CS according to their order of distribution in the mailman's round.

Since the batches L1 and L2 are already preordered, the storage loop M11 is normally emptied before the storage loop M12 and the storage loop M21 is normally emptied before the storage loop M22, so that the storage loops M11 and M12 or M21 and M22 can operate alternately.

Thus, when the storage loop M11 is completely emptied, this being symbolized by the block 31, the control/command unit U acts on the unit D1 so as to serialize on exit from D1, N1/2 mail items, this being symbolized by the block 14, which are transferred into the storage loop M11, this being symbolized by the block 16, after being made to travel past DL1 for the reading of the postal addresses, this being symbolized by the block 15. Likewise, when the storage loop M21 is completely emptied, the control/command unit U acts on the unit D2 so as to serialize on exit from D2, N1/2 mail items, this being symboled by the block 24, which are transferred into the storage loop M21, this being symbolized by the block 26, after being made to travel past DL2 for the reading of the postal addresses, this being symbolized by the block 25.

The block 32 symbolizes the analysis in the control/command unit U of the new postal addresses recovered by DL1 and DL2 for the corresponding transferring in sequence of the mail items to the conveyor CS.

Now, when the storage loop M12 is completely emptied, this being symbolized by the block 33, the control/command unit U acts on the unit D1 so as to serialize on exit from D1, N1/2 mail items, this being symbolized by the block 17, which are transferred into the storage loop M11, this being symbolized by the block 19, after being made to travel past DL1 for the reading of the postal addresses, this being symbolized by the block 18. Likewise, when the dynamic storage loop M22 is completely emptied, the control/command unit U acts on the unit D2 so as to serialize on exit from D2, N1/2 mail items, this being symbolized by the block 24, which are transferred into the storage loop M21, this being symbolized by the block 26, after being made to travel past DL2 for the reading of the postal addresses, this being symbolized by the block 25. The block 34 symbolizes the analysis in the control/command unit U of the postal addresses recovered by DL1 and DL2 for the corresponding transferring in sequence of the mail items to the conveyor CS.

The procedure loops back around the block 31 until D1 and D2 are completely emptied.

With the procedure indicated above, the interclassification window of the two batches of mail items corresponds to the storage capacity of two storage loops (6 mail items in the exemplary case of FIG. 1).

Certain defects of classification in the batches of mail items L1 or L2 may be recovered by the control/command unit U by using the storage loop M3 whose capacity may be greater than that of one of the storage loops M11 to M22, the storage capacity of the loop M3 corresponding to the shifting of a mail item which it is possible to recover.

The process according to the invention can ideally be applied in respect of the merging of previously ordered batches of objects other than batches of mail items, for example, baggage items or the like, provided that each object bears a cue allowing its classification according to a certain sequence.

What is claimed is:

1. Process for merging batches of objects (L1, L2), each previously ordered according to a certain classification of the objects (A), so as to constitute a single batch of objects ordered according to said classification, in which process said batches are loaded in destacking units (D1, D2) which deliver said objects in series and in which each object destacked from a destacking unit travels past a device (DL1, DL2) for reading a classification cue of said object to be transferred to a conveyor (CS) linked to said destacking units in a such a way that the objects exit the conveyor in series according to the order corresponding to said classification, wherein said objects destacked from a destacking unit (D1, D2) are transferred to said conveyor (CS) through at least a first (M11, M21) and a second (M12, M22) dynamic-storage magazine linked and associated to said destacking unit, said destacked objects moving in series into each dynamic-storage magazine around a storage loop, in that a control/command unit (U) controls each destacking unit (D1, D2) and the first and second dynamic-storage magazine (M11, M12; M21, M22) associated to said destacking unit for loading said first dynamic-storage magazine (M11, M21) with a certain number of first ordered objects destacked from said destacking unit and for loading said second dynamic-storage magazine (M12, M22) with a certain amount of following ordered objects destacked from said destacking unit, and in that said control/command unit (U) analyses the classifying cues for the objects pending in the dynamic-storage magazines to cause said first dynamic-storage magazine (M11, M21) associated to a destacking unit to be emptied to said conveyor before said second dynamic-storage magazine (M12, M22) associated to said destacking unit to be emptied to said conveyor, the loading and the emptying of said dynamic-storage magazines being repeated until said destacking units are completely emptied.

2. Process according to claim 1, in which said first (M11, M21) and second (M12, M22) dynamic-storage magazine linked and associated to a destacking unit (D1, D2) operate alternatively to be loaded with destacked objects and emptied to said conveyor.

3. Process according to any one of claims 1 to 2, in which said objects are mail items and in that said classification is an order of distribution of mail items in the mailman's round.

4. Machine for carrying out the process according to claim 1, in which said first (M11, M21) and second (M12, M22) dynamic-storage magazine linked and associated to a destacking unit (D1, D2) have corresponding entrances (E) linked in parallel to said destacking unit and corresponding exits (S) linked in parallel to said conveyor (CS), and in which a device (DL1, DL2) for reading a classification cue is disposed between each destacking unit (D1, D2) and its first and second associated dynamic-storage magazine (M11, M12; M21, M22).

5. Machine according to claim 4, in which a delay line (R) is mounted between the exit (S) of each dynamic-storage magazine (M11, M12, M21, M22) and said conveyor (CS).

6. Machine according to claim 4, in which a further dynamic-storage magazine (M3) is mounted in parallel with said conveyor (CS) downstream said dynamic-storage magazines (M11, M12, M21, M22).

7. Machine according to claim 6, in which said further dynamic-storage magazine (M3) comprises a storage loop.

8. Machine according to claim 4, in which said first and second dynamic-storage magazine (M11, M12; M21, M22) linked and associated to a destacking unit (D1, D2) have the same storage capacity.

* * * * *